(12) United States Patent
Zhu et al.

(10) Patent No.: US 10,672,283 B2
(45) Date of Patent: Jun. 2, 2020

(54) OBSTACLE AVOIDANCE METHOD AND DEVICE, MOVEABLE OBJECT AND COMPUTER READABLE STORAGE MEDIUM

(71) Applicant: AUTEL ROBOTICS CO., LTD., Shenzhen, Guangdong (CN)

(72) Inventors: Ying Zhu, Guangdong (CN); Yu Song, Guangdong (CN); Denglu Wu, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 90 days.

(21) Appl. No.: 15/883,514

(22) Filed: Jan. 30, 2018

(65) Prior Publication Data

US 2019/0130773 A1  May 2, 2019

Related U.S. Application Data

(63) Continuation of application No. PCT/CN2017/109125, filed on Nov. 2, 2017.

(51) Int. Cl.
*G08G 5/04* (2006.01)
*G05D 1/02* (2020.01)
(Continued)

(52) U.S. Cl.
CPC ........... *G08G 5/045* (2013.01); *B64C 39/024* (2013.01); *G05D 1/024* (2013.01); *G05D 1/101* (2013.01);
(Continued)

(58) Field of Classification Search
USPC .......................................................... 701/3
See application file for complete search history.

(56) References Cited

U.S. PATENT DOCUMENTS 6,678,394 B1 * 1/2004 Nichani ............... G05D 1/0251
348/169
9,442,485 B1 * 9/2016 McDermott ......... G05D 1/0094
(Continued)

FOREIGN PATENT DOCUMENTS

| CN | 105955303 A | 9/2016 |
| CN | 105955304 A | 9/2016 |
| CN | 106960454 A | 7/2017 |

OTHER PUBLICATIONS

Franz Andert et al. "Depth Image Processing for Obstacle Avoidance of an Autonomous VTOL UAV", Nov. 5, 2006; XP055533768, Retrieved from the Internet: URL: https://elib/dlr.de/51449/1/jt2006-010.pdf.

(Continued)

*Primary Examiner* — Tyler D Paige (57) ABSTRACT

This specification discloses an obstacle avoidance method and device, a moveable object and a computer readable storage medium. The obstacle avoidance method includes: obtaining a depth value of a spot in an area containing an obstacle, the depth value representing a distance between the spot and the moveable object; judging, according to the depth value, whether an edge of the obstacle exists in the area; and if the edge of the obstacle exists in the area, determining a movement direction of the moveable object according to the edge, so as to avoid the obstacle. According to embodiments of the present invention, an obstacle grid map does not need to be established, and a movement track does not need to be predicted, achieving advantages of a small amount of calculation and high control accuracy.

26 Claims, 6 Drawing Sheets

(51) Int. Cl.
    *B64C 39/02*     (2006.01)
    *H04N 7/18*     (2006.01)
    *G05D 1/10*     (2006.01)
    *G06T 7/13*     (2017.01)
    *G08G 5/00*     (2006.01)

(52) U.S. Cl.
    CPC .............. G06T 7/13 (2017.01); G08G 5/0021 (2013.01); G08G 5/0069 (2013.01); H04N 7/185 (2013.01); *B64C 2201/123* (2013.01); *B64C 2201/127* (2013.01); *B64C 2201/141* (2013.01); *G06T 2207/10028* (2013.01)

(56) References Cited

U.S. PATENT DOCUMENTS

| | | | |
|---|---|---|---|
| 2010/0121574 A1* | 5/2010 | Ariyur | G05D 1/101 701/301 |
| 2017/0045613 A1* | 2/2017 | Wang | G01S 13/9303 |
| 2017/0176575 A1* | 6/2017 | Smits | G01S 17/003 |
| 2017/0193830 A1 | 7/2017 | Fragoso et al. | |
| 2017/0359515 A1* | 12/2017 | Harris | H04N 5/23258 |
| 2018/0158197 A1* | 6/2018 | Dasgupta | G05D 1/0094 |

OTHER PUBLICATIONS

Radu Horaud, et al; "An Overview of Depth Cameras and Range Scanners Based on Time-Of-Flight Technologies", Jun. 1, 2016; pp. 1005-1020; XP055533733, https://hal.inria.fr/hal-01325045/document.

Ramesh Raskar, et al; "Non-photorealisticf Camera: Depth Edge Detection and Stylized Rendering using Multi-Flash Imaging"; ACM Transactions on Graphics (TOG), Aug. 1, 2004, pp. 679-688; XP055533718.

Gao Zhu, et al; "Tracking Randomly Moving Objects on Edge Box Proposals", Jul. 29, 2015; pp. 157-173, XP0555337823.

International Search Report dated Jul. 2, 2018; PCT/CN2017/109125.

Supplementary European Search Report completed Dec. 13, 2018; EP17814294.

* cited by examiner

OBSTACLE AVOIDANCE METHOD AND DEVICE, MOVEABLE OBJECT AND COMPUTER READABLE STORAGE MEDIUM

CROSS REFERENCE

This application is a continuation of International Application No. PCT/CN2017/109125, filed on Nov. 2, 2017, the disclosure of which is hereby incorporated by reference in its entirety.

TECHNICAL FIELD

The present invention relates to the field of motion control, and in particular, to an obstacle avoidance method and device, a moveable object and a computer readable storage medium.

RELATED ART

In the prior art, a moveable object senses an obstacle mainly by using various sensors, such as ultrasonic waves, a radar, infrared rays, a monocular camera, a binocular camera, a multi-lens camera, or a laser radar. A sensor of this type may directly or indirectly obtain distance information about an obstacle in front of a moveable object. The distance information may be about a distance from a single spot on the obstacle to the moveable object, a distance from a line on the obstacle to the moveable object, or distances from all spots on a plane to the moveable object.

Planning a detour path for obstacle avoidance is to calculate a best detour path mainly according to obstacle information and the distance information that are obtained by the sensor. However, there is a defect that requirements for the accuracy and the compute power of the sensor are relatively high.

SUMMARY

The following is a summary of the subject described in detail in this specification. This summary is not intended to limit the protection scope of the claims.

Embodiments of the present invention provide an obstacle avoidance method with a small amount of calculation and high control accuracy, an obstacle avoidance device, a moveable object and a computer readable storage medium.

According to a first aspect, an embodiment of the present invention provides an obstacle avoidance method, applied to a moveable object, and including:

obtaining a depth value of a spot in an area containing an obstacle, the depth value representing a distance between the spot and the moveable object;

judging, according to the depth value, whether an edge of the obstacle exists in the area; and if the edge of the obstacle exists in the area, determining a movement direction of the moveable object according to the edge, so as to avoid the obstacle.

In an embodiment of the present invention, the judging, according to the depth value, whether an edge of the obstacle exists in the area includes:

judging whether a spot of which a depth value is zero exists in the area; and if the spot of which the depth value is zero exists, determining that the edge of the obstacle exists.

In an embodiment of the present invention, the judging, according to the depth value, whether an edge of the obstacle exists in the area includes:

determining a first area composed of a spot of which a depth value is zero in the area;

determining a second area composed of a spot of which a depth value is not zero in the area; and determining a boundary between the first area and the second area as the edge of the obstacle.

In an embodiment of the present invention, the judging, according to the depth value, whether an edge of the obstacle exists in the area includes:

obtaining a depth value of a first spot in the area;

obtaining a depth value of a second spot adjacent to the first spot in the area;

judging whether the depth value of the first spot and the depth value of the second spot meet a preset condition; and if the depth value of the first spot and the depth value of the second spot meet the preset condition, judging that the edge of the obstacle exists between the first spot and the second spot.

In an embodiment of the present invention, the judging whether the depth value of the first spot and the depth value of the second spot meet a preset condition includes:

determining that the depth value of at least one of the first spot and the second spot is not zero;

judging whether a spot of which a depth value is zero exists in the first spot and the second spot; and if the spot of which the depth value is zero exists in the first spot and the second spot, determining that the depth value of the first spot and the depth value of the second spot meet the preset condition.

In an embodiment of the present invention, the determining that the depth value of at least one of the first spot and the second spot is not zero includes:

determining that an absolute value of a difference between the depth value of the first spot and the depth value of the second spot is greater than a preset value.

In an embodiment of the present invention, the preset value is a value greater than zero.

In an embodiment of the present invention, the determining that the depth value of at least one of the first spot and the second spot is not zero includes:

determining that a sum of the depth value of the first spot and the depth value of the second spot is greater than zero.

In an embodiment of the present invention, the judging whether a spot of which a depth value is zero exists in the first spot and the second spot includes:

determining whether a product of the depth values of the two spots is zero; and if the product is zero, determining that the spot of which the depth value is zero exists in the first spot and the second spot.

In an embodiment of the present invention, the obtaining a depth value of a spot in an area containing an obstacle includes:

scanning the area by using a depth sensor, to obtain the depth value of the spot.

In an embodiment of the present invention, the depth sensor includes at least one of the following:

a binocular camera, a laser radar, a structured light depth camera, or a time of flight (TOF) depth camera.

In an embodiment of the present invention, the determining a movement direction of the moveable object according to the edge includes:

obtaining a scanning angle at which the depth sensor scans the edge of the obstacle; and determining the movement direction of the moveable object according to the scanning angle.

In an embodiment of the present invention, the determining the movement direction of the moveable object according to the scanning angle includes:

calculating an absolute value of difference between the scanning angle at which the depth sensor scans the edge of the obstacle and a half angle of view of the depth sensor;

selecting a minimum value in the absolute value; and adjusting a heading direction of the moveable object according to the minimum value in the absolute value, to enable the moveable object to fly to a side of the edge of the obstacle.

In an embodiment of the present invention, the scanning the area by using a depth sensor, to obtain the depth value of the spot includes:

scanning, by using the depth sensor, the area in a horizontal direction, a vertical direction, or any other direction, to obtain the depth value of the spot.

In an embodiment of the present invention, the moveable object includes any of the following:

a manned aircraft, an unmanned aircraft, a robot, an automobile, or a boat.

According to a second aspect, an embodiment of the present invention provides an obstacle avoidance device, applied to a moveable object, and including:

an obtaining module, configured to obtain a depth value of a spot in an area containing an obstacle, the depth value representing a distance between the spot and the moveable object;

a judging module, configured to judge, according to the depth value, whether an edge of the obstacle exists in the area; and a determining module, configured to determine a movement direction of the moveable object according to the edge, so as to avoid the obstacle.

In an embodiment of the present invention, the judging module is specifically configured to:

judge whether a spot of which a depth value is zero exists in the area; and if the spot of which the depth value is zero exists, determine that the edge of the obstacle exists.

In an embodiment of the present invention, the judging module is specifically configured to:

determine a first area composed of a spot of which a depth value is zero in the area;

determine a second area composed of a spot of which a depth value is not zero in the area; and determine a boundary between the first area and the second area as the edge of the obstacle.

In an embodiment of the present invention, the judging module is specifically configured to:

obtain a depth value of a first spot in the area;

obtain a depth value of a second spot adjacent to the first spot in the area;

judge whether the depth value of the first spot and the depth value of the second spot meet a preset condition; and if the depth value of the first spot and the depth value of the second spot meet the preset condition, judge that the edge of the obstacle exists between the first spot and the second spot.

In an embodiment of the present invention, the judging module is specifically configured to:

determine that the depth value of at least one of the first spot and the second spot is not zero;

judge whether a spot of which a depth value is zero exists in the first spot and the second spot; and if the spot of which the depth value is zero exists in the first spot and the second spot, determine that the depth value of the first spot and the depth value of the second spot meet the preset condition.

In an embodiment of the present invention, the judging module is specifically configured to:

determine that an absolute value of a difference between the depth value of the first spot and the depth value of the second spot is greater than a preset value.

In an embodiment of the present invention, the preset value is a value greater than zero.

In an embodiment of the present invention, the judging module is specifically configured to:

determine that a sum of the depth value of the first spot and the depth value of the second spot is greater than zero.

In an embodiment of the present invention, the judging module is specifically configured to:

determine whether a product of the depth values of the two spots is zero; and if the product is zero, determine that the spot of which the depth value is zero exists in the first spot and the second spot.

In an embodiment of the present invention, the obtaining module scans the area by using a depth sensor, to obtain the depth value of the spot.

In an embodiment of the present invention, the depth sensor includes at least one of the following:

a binocular camera, a laser radar, a structured light depth camera, or a TOF depth camera.

In an embodiment of the present invention, the determining module is configured to:

obtain a scanning angle at which the depth sensor scans the edge of the obstacle; and determine the movement direction of the moveable object according to the scanning angle.

In an embodiment of the present invention, the determining module is specifically configured to:

calculate an absolute value of difference between the scanning angle at which the depth sensor scans the edge of the obstacle and a half angle of view of the depth sensor;

select a minimum value in the absolute value; and adjust a heading direction of the moveable object according to the minimum value in the absolute value, to enable the moveable object to fly to a side of the edge of the obstacle.

In an embodiment of the present invention, the obtaining module scans, by using the depth sensor, the area in a horizontal direction, a vertical direction, or any other direction, to obtain the depth value of the spot.

In an embodiment of the present invention, the moveable object includes any of the following:

a manned aircraft, an unmanned aircraft, a robot, an automobile, or a boat.

According to a third aspect, an embodiment of the present invention provides a moveable object including a main body and a depth sensor connected to the main body, where the depth sensor is configured to obtain a depth value of a spot in an area containing an obstacle, the depth value representing a distance between the spot and the moveable object; and the moveable object further includes a controller, the controller being configured to:

judge, according to the depth value, whether an edge of the obstacle exists in the area; and if the edge of the obstacle exists in the area, determine a movement direction of the moveable object according to the edge, so as to avoid the obstacle.

In an embodiment of the present invention, the controller is specifically configured to:

judge whether a spot of which a depth value is zero exists in the area; and if the spot of which the depth value is zero exists, determine that the edge of the obstacle exists.

In an embodiment of the present invention, the controller is specifically configured to:

determine a first area composed of a spot of which a depth value is zero in the area;

determine a second area composed of a spot of which a depth value is not zero in the area; and determine a boundary between the first area and the second area as the edge of the obstacle.

In an embodiment of the present invention, the controller is specifically configured to:

obtain a depth value of a first spot in the area;

obtain a depth value of a second spot adjacent to the first spot in the area;

judge whether the depth value of the first spot and the depth value of the second spot meet a preset condition; and if the depth value of the first spot and the depth value of the second spot meet the preset condition, judge that the edge of the obstacle exists between the first spot and the second spot.

In an embodiment of the present invention, the controller is specifically configured to:

determine that the depth value of at least one of the first spot and the second spot is not zero;

judge whether a spot of which a depth value is zero exists in the first spot and the second spot; and if the spot of which the depth value is zero exists in the first spot and the second spot, determine that the depth value of the first spot and the depth value of the second spot meet the preset condition.

In an embodiment of the present invention, the controller is specifically configured to:

determine that an absolute value of a difference between the depth value of the first spot and the depth value of the second spot is greater than a preset value.

In an embodiment of the present invention, the preset value is a value greater than zero.

In an embodiment of the present invention, the controller is specifically configured to:

determine that a sum of the depth value of the first spot and the depth value of the second spot is greater than zero.

In an embodiment of the present invention, the controller is specifically configured to:

determine whether a product of the depth values of the two spots is zero; and if the product is zero, determine that the spot of which the depth value is zero exists in the first spot and the second spot.

In an embodiment of the present invention, the controller is configured to scan the area by using the depth sensor, to obtain the depth value of the spot.

In an embodiment of the present invention, the depth sensor includes at least one of the following:

a binocular camera, a laser radar, a structured light depth camera, or a TOF depth camera.

In an embodiment of the present invention, the controller is specifically configured to:

obtain a scanning angle at which the depth sensor scans the edge of the obstacle; and determine the movement direction of the moveable object according to the scanning angle.

In an embodiment of the present invention, the controller is specifically configured to:

calculate an absolute value of difference between the scanning angle at which the depth sensor scans the edge of the obstacle and a half angle of view of the depth sensor;

select a minimum value in the absolute value; and adjust a heading direction of the moveable object according to the minimum value in the absolute value, to enable the moveable object to fly to a side of the edge of the obstacle.

In an embodiment of the present invention, the controller scans, by using the depth sensor, the area in a horizontal direction, a vertical direction, or any other direction, to obtain the depth value of the spot.

In an embodiment of the present invention, the moveable object includes any of the following:

a manned aircraft, an unmanned aircraft, a robot, an automobile, or a boat.

According to the fourth aspect, an embodiment of the present invention provides a moveable object that includes a memory and a processor, where the memory stores a computer program, and when the computer program is executed by the processor, the processor is enabled to execute the obstacle avoidance method described above.

According to a fifth aspect, an embodiment of the present invention provides a computer readable storage medium that stores a computer program, where when the computer program is executed by a processor, the processor implements the obstacle avoidance method described above.

Other features and advantages of the present invention are described in the following specification, and some become obvious with reference to the specification or are understood by implementing the present invention. Objectives and other advantages of the present invention may be implemented and achieved through structures particularly described in the specification, the claims and the accompanying drawings.

BRIEF DESCRIPTION OF THE DRAWINGS

The accompanying drawings provide further understanding to the technical solutions of the present invention, constitute a part of the specification and, together with the embodiments of the present invention, serve to explain the technical solutions of the present invention but do not constitute a limitation to the technical solutions of the present invention.

DETAILED DESCRIPTION

The embodiments of the present invention are described below in detail with reference to the accompanying drawings. It should be noted that when there is no conflict, the embodiments of the present invention and features in the embodiments may be freely combined with each other.

Steps shown in the flowcharts of the accompanying drawings may be performed in, for example, a computer system of a set of computer executable instructions. Moreover, although logic sequences are shown in the flowcharts, in some cases, the shown or described steps may be performed in sequences different from the sequences herein.

The embodiments of the present invention provide an obstacle avoidance method and an obstacle avoidance device that may avoid an obstacle by detecting an edge of the obstacle and a moveable object using the obstacle avoidance method or the obstacle avoidance device. The method does not need to establish a map or predict a movement track, and has advantages of a small amount of calculation and high control accuracy.

Figure 1:
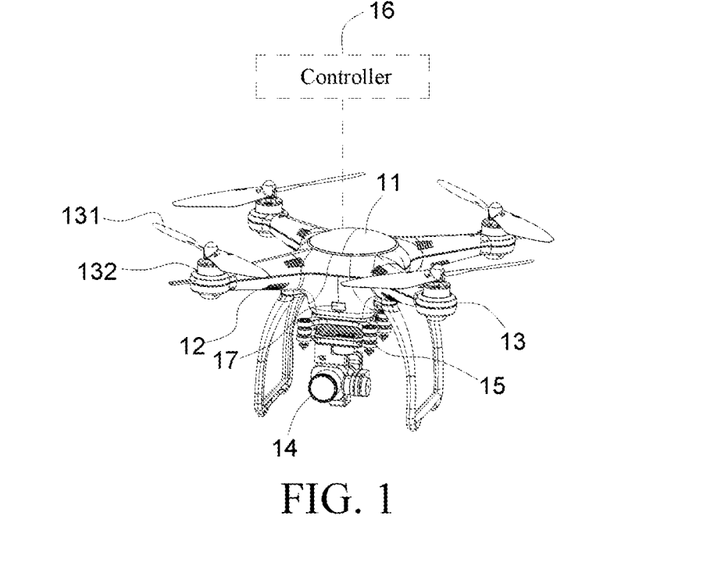
FIG. 1 is a schematic structural diagram of an aircraft according to an embodiment of the present invention.

As shown in FIG. 1, in an embodiment of the present invention, the moveable object is an aircraft. In other possible embodiments, the moveable object may alternatively be a manned aircraft, a robot, an automobile, a boat, a model airplane, an unmanned airship, a fixed-wing aircraft, or an unmanned hot air balloon. The aircraft in this embodiment of the present invention includes a housing 11, a machine arm 12 connected to the housing 11, a power device 13 disposed on one end of the machine arm 12, a gimbal 15 connected to the housing 11, an image apparatus 14 connected to the gimbal 15, a controller 16 disposed in the housing 11 and a depth sensor 17 connected to the housing 11.

In this embodiment, there are four machine arms 12 that is, the aircraft is a four-rotor aircraft. In other possible embodiments, the quantity of machine arms 12 may be 3, 6, 8, 10, or the like.

The power device 13 includes a motor 132 disposed on one end of the machine arm 12 and a propeller 131 connected to a rotating shaft of the motor 132. The rotating shaft of the motor 132 rotates to drive the propeller 131 to rotate, so as to provide a lifting force for an aircraft 10.

The gimbal 15 is configured to alleviate or ever eliminate vibration transferred by the power device 13 to the image apparatus 14, so as to ensure that the image apparatus 14 can shoot a stable and clear image or video.

The image apparatus 14 may be a binocular camera, a monocular camera, an infrared image apparatus, an ultraviolet image apparatus, a video camera, or a similar apparatus. The image apparatus 14 may be directly carried on the aircraft 10, or may be carried on the aircraft 10 by using the gimbal 15 shown in this embodiment. The gimbal 15 permits the image apparatus 14 to rotate around at least one shaft relative to the aircraft 10.

The depth sensor 17 may be a binocular camera, a laser radar, a structured light depth camera, or a TOF depth camera.

Figure 2:
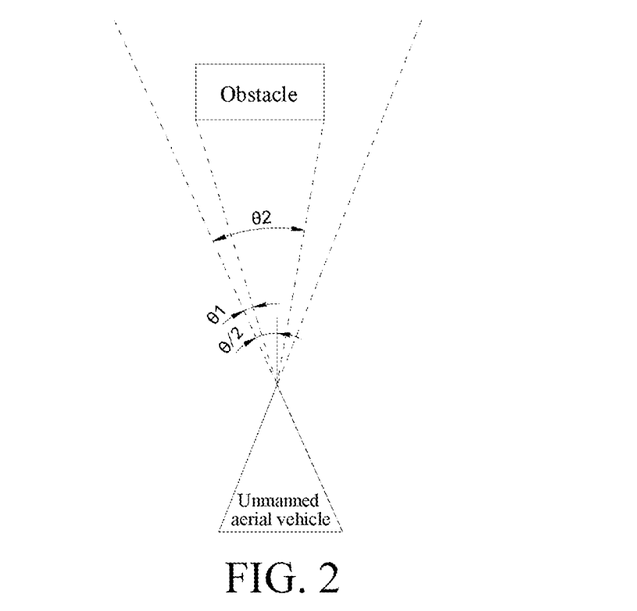
FIG. 2 is a schematic diagram showing that the aircraft shown in FIG. 1 scans an area containing an obstacle.

As shown in FIG. 2, first, the depth sensor 17 scans an area containing an obstacle, to obtain a depth value of a spot in the area. The depth value represents a distance between a spot in the area and the aircraft. In an embodiment of the present invention, the depth value being zero represents that the depth sensor 17 does not scan an obstacle.

An area between two dashed lines on outermost sides in FIG. 2 is an angle-of-view range of the depth sensor 17, and the depth sensor 17 can scan only within the angle-of-view range. Therefore, during scanning, the obstacle needs to be placed within the angle-of-view range of the depth sensor 17. The depth sensor 17 may scan along a direction from left to right or from right to left, that is, a horizontal direction in FIG. 2, or may scan along a direction from top to bottom or from bottom to top, that is, a vertical direction. In other possible embodiments, the depth sensor 17 may even scan along any direction.

Figure 3:
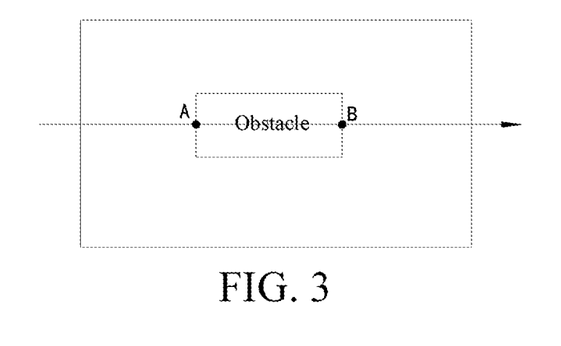
FIG. 3 is an image that is obtained by scanning along a horizontal direction by the aircraft shown in FIG. 1 and contains an obstacle.
Figure 4:
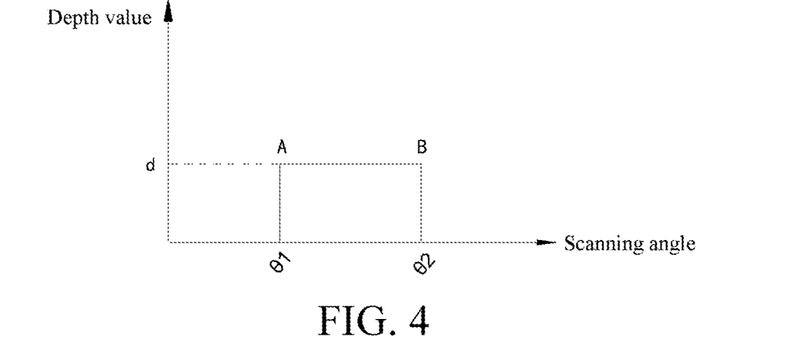
FIG. 4 is a depth view corresponding to the image shown in FIG. 3.

FIG. 3 is an image that is obtained by scanning along the horizontal direction by the depth sensor 17 and contains an obstacle, and FIG. 4 is a depth view corresponding to the image shown in FIG. 3. In FIG. 3, when the depth sensor 17 scans along the horizontal direction, because there is no obstacle on a left side of a spot A, a depth value corresponding to a spot in the area in FIG. 4 is zero. When the depth sensor 17 scans at an angle θ1, that is, the spot A. because the spot A is a spot on the obstacle, there is a corresponding value d(θ1) in FIG. 4. When the depth sensor 17 continues to scan at an angle θ2, that is, a spot B. because the spot B is a spot on the obstacle, there is a corresponding value d(θ2) in FIG. 4. There is no obstacle on a right side of the spot B, and therefore, a depth value of a spot in the area is correspondingly zero in FIG. 4. In addition, a surface of the obstacle is a horizontal plane, and therefore, depth values of spots from the spot A to the spot B on the obstacle are equal. It may be understood that when the surface of the obstacle is not a horizontal plane, the depth values of the spots between the spot A and the spot B are not equal, and a line connecting the spot A to the spot B in FIG. 4 is not a horizontal line.

Subsequently, the controller 16 judges, according to the depth value obtained by the depth sensor 17, whether an edge of the obstacle exists in the scanned area.

Figure 5:
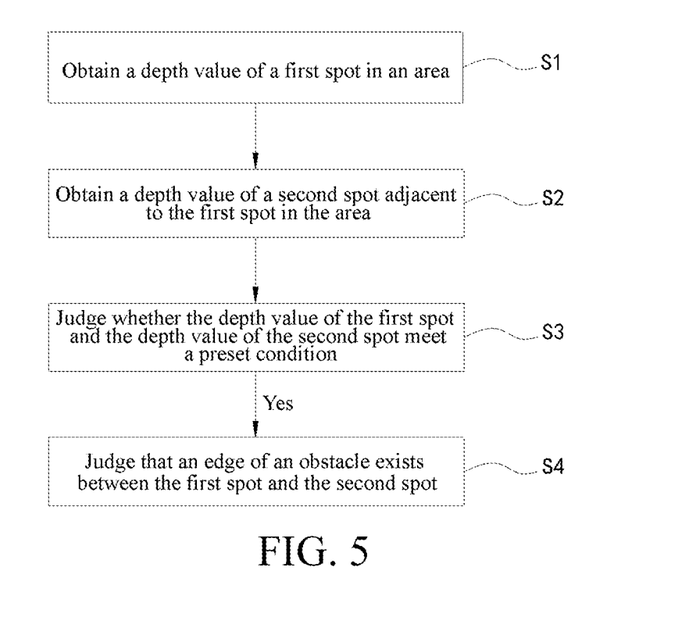
FIG. 5 is a flowchart showing that a controller in the aircraft shown in FIG. I judges whether an edge of an obstacle exists in a scanned area.

As shown in FIG. 5, in an embodiment of the present invention, the controller 16 judges whether the edge of the obstacle exists in the scanned area according to the following steps:

S1. Obtain a depth value of a first spot in the scanned area.

S2. Obtain a depth value of a second spot adjacent to the first spot in the scanned area.

The first spot and the second spot may be randomly selected in the scanned area of the depth sensor 17, and the depth values of both the first spot and the second spot may be obtained according to scan results of the depth sensor 17.

S3. Judge whether the depth value of the first spot and the depth value of the second spot meet a preset condition.

Figure 6:
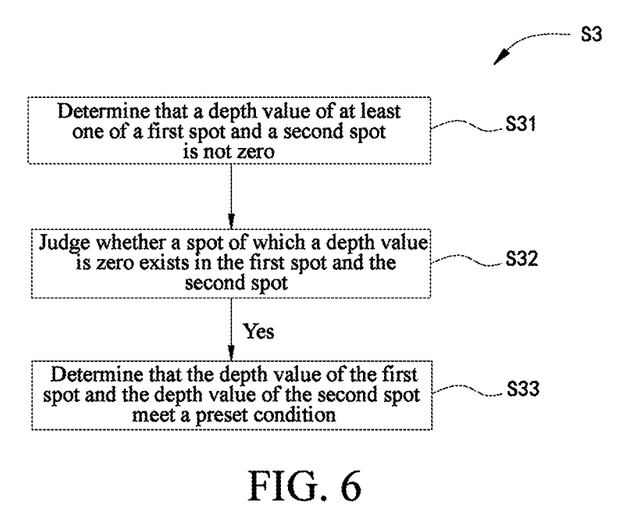
FIG. 6 is a flowchart showing that the controller in the aircraft shown in FIG. 1 determines whether a depth value of a first spot and a depth value of a second spot meet a preset condition.

As shown in FIG. 6, in an embodiment of the present invention, the controller 16 may further determine whether the depth value of the first spot and the depth value of the second spot meet a preset condition according to the following steps:

S31. Determine that the depth value of at least one of the first spot and the second spot is not zero.

In an embodiment of the present invention, determining that the depth value of at least one of the first spot and the second spot is not zero is performed by calculating whether an absolute value of a difference between the depth value of the first spot and the depth value of the second spot is greater than a preset value. The preset value is a value greater than but not equal to zero. In other possible embodiments, determining that the depth value of at least one of the first spot and the second spot is not zero may alternatively be performed by judging whether a sum of the depth value of the first spot and the depth value of the second spot is greater than zero. If the sum of the depth values of the two spots is greater than zero, it may be determined that the depth value of at least one of the first spot and the second spot is not zero.

An objective of performing this step is to ensure that at least one of the two selected spots falls on the obstacle.

S32. Judge whether a spot of which a depth value is zero exists in the first spot and the second spot.

In an embodiment of the present invention, judging whether a spot of which a depth value is zero exists in the first spot and the second spot may be performed by judging whether a product of the depth values of the two spots is zero. If the depth value of one of the two spots is zero, the product of the depth value of the two spots is necessarily zero.

Based on step S31, an objective of performing this step is to ensure that one of the two selected spots does not fall on the obstacle. The depth value of the spot that does not fall on the obstacle is zero.

S33. If the spot of which the depth value is zero exists in the first spot and the second spot, determine that the depth value of the first spot and the depth value of the second spot meet the preset condition.

S4. Judge that an edge of the obstacle exists between the first spot and the second spot.

There is a depth value jump from the depth value being zero to the depth value not being zero. This means that the edge of the obstacle necessarily exists between the spot of which the depth value is zero and the spot of which the depth value is not zero. For example, in the depth view shown in FIG. 4, scanning is started from the left side of the spot A. Because there is no obstacle, the depth value is kept zero. However, when the spot A is scanned, a depth value jump occurs. That is, the depth value jumps from zero to $d(\theta 1)$. Therefore, it may be obtained that the spot A is a spot on the edge of the obstacle.

In another embodiment of the present invention, the controller 16 may further judge, in the following manner, whether the edge of the obstacle exists:

determining a first area composed of a spot of which a depth value is zero in an area containing the obstacle;

determining a second area composed of a spot of which a depth value is not zero in the area containing the obstacle; and determining a boundary between the first area and the second area as the edge of the obstacle.

In other possible embodiments, whether the edge of the obstacle exists may alternatively be determined by judging whether a spot of which a depth value is zero exists in the scanned area. If such a spot exists, it indicates that the edge of the obstacle necessarily exists.

After determining that the edge exists between the two spots, the controller 16 obtains an angle at which the depth sensor 17 scans the edge of the obstacle, that is, an angle at which the depth value suddenly changes; and then determines a flight direction of the aircraft according to the scanning angle.

Using FIG. 2 as an example, assuming that the depth sensor 17 scans in a direction from left to right in FIG. 2, two edges, that is, an edge on a left side and an edge on a right side, of the obstacle may be scanned within a scanning range of the depth sensor 17. Assuming that a scanning angle at which the edge on the left side is scanned is $\theta 1$, a scanning angle at which the edge on the right side is scanned is $\theta 2$, and an angle of view of the depth sensor 17 is $\theta$, then a half angle of view is $\theta/2$. The flight direction of the aircraft directly faces the obstacle, that is, the vertical direction. Therefore, there are two solutions for the aircraft to fly while avoiding the obstacle, one is flying to the left at a yawing angle of $\theta/2-\theta 1$, and the other one is flying to the right at a yawing angle of $\theta 2-\theta/2$. It can be learned from the figure that $|\theta 2-\theta/2|$ is less than $|\theta/2-\theta 1|$. Therefore, it is optimal for the aircraft to fly to the right at the yawing angle of $\theta/2-\theta 1$. It may be understood that in another embodiment of the present invention, the aircraft may alternatively fly to the left at the yawing angle of $\theta/2-\theta 1$.

Figure 7:
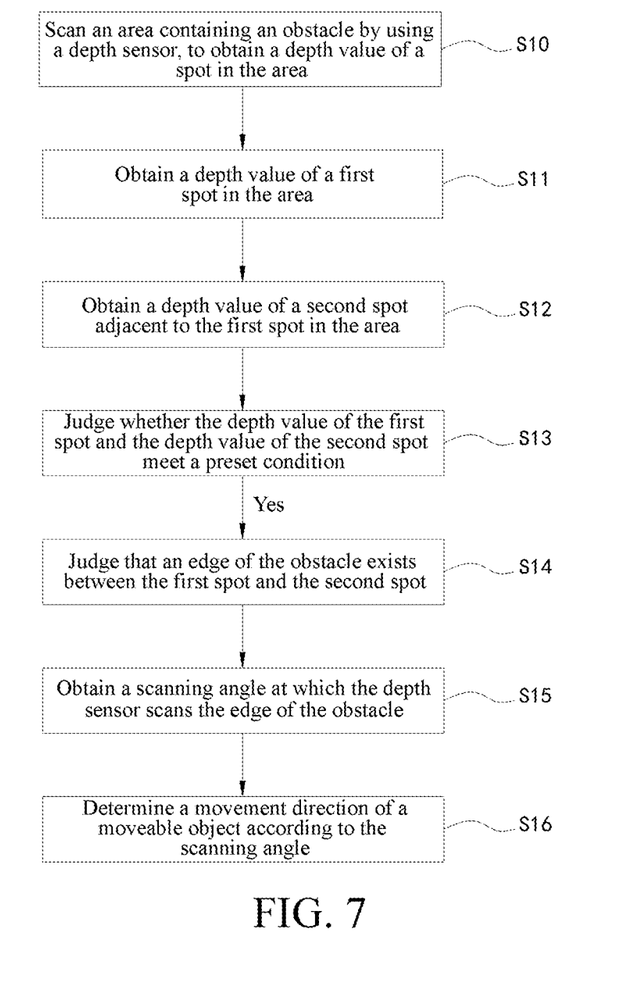
FIG. 7 is a flowchart of an obstacle avoidance method according to an embodiment of the present invention.

As shown in FIG. 7, an embodiment of the present invention further provides an obstacle avoidance method. The method is applied to a moveable object, and includes the following steps:

S10. Scan an area containing an obstacle by using a depth sensor, to obtain a depth value of a spot in the area, the depth value representing a distance between the spot and a moveable object.

S11. Obtain a depth value of a first spot in the area.

S12. Obtain a depth value of a second spot adjacent to the first spot in the area.

S13. Judge whether the depth value of the first spot and the depth value of the second spot meet a preset condition.

Figure 8:
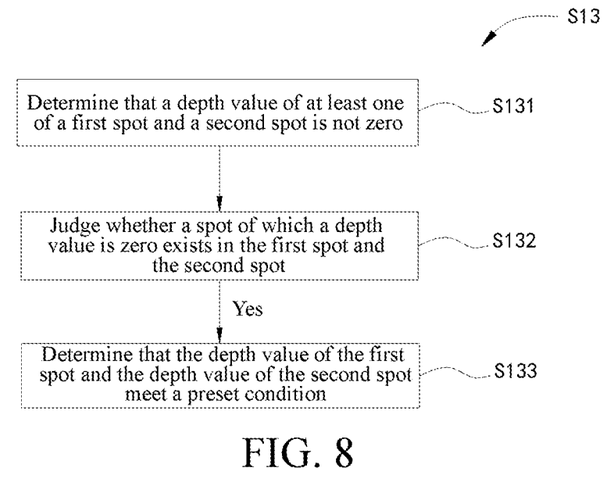
FIG. 8 is a flowchart of determining whether a depth value of a first spot and a depth value of a second spot meet a preset condition in the method shown in FIG. 7.

As shown in FIG. 8, in an embodiment of the present invention, whether the depth value of the first spot and the depth value of the second spot meet the preset condition may be determined according to the following steps:

S131. Determine that the depth value of at least one of the first spot and the second spot is not zero.

In an embodiment of the present invention, determining that the depth value of at least one of the first spot and the second spot is not zero is performed by calculating whether an absolute value of a difference between the depth value of the first spot and the depth value of the second spot is greater than a preset value. The preset value is a value greater than but not equal to zero. In other possible embodiments, determining that the depth value of at least one of the first spot and the second spot is not zero may alternatively be performed by judging whether a sum of the depth value of the first spot and the depth value of the second spot is greater than zero. lithe sum of the depth values of the two spots is greater than zero, it may be determined that the depth value of at least one of the first spot and the second spot is not zero.

An objective of performing this step is to ensure that at least one of the two selected spots falls on the obstacle.

S132. Judge whether a spot of which a depth value is zero exists in the first spot and the second spot.

In an embodiment of the present invention, judging whether a spot of which a depth value is zero exists in the first spot and the second spot may be performed by judging whether a product of the depth values of the two spots is zero. If the depth value of one of the two spots is zero, the product of the two spots is necessarily zero.

Based on step S131, an objective of performing this step is to ensure that one of the two selected spots does not fall on the obstacle. The depth value of the spot that does not fall on the obstacle is zero.

S133. If the spot of which the depth value is zero exists in the first spot and the second spot, determine that the depth value of the first spot and the depth value of the second spot meet the preset condition.

S14. If the preset condition is met, judge that an edge of the obstacle exists between the first spot and the second spot.

There is a depth value jump from the depth value being zero to the depth value not being zero. This means that the edge of the obstacle necessarily exists between the spot of which the depth value is zero and the spot of which the depth value is not zero. For example, in the depth view shown in FIG. 4, scanning is started from the left side of the spot A. Because there is no obstacle, the depth value is kept zero. However, when the spot A is scanned, a depth value jump occurs. That is, the depth value jumps from zero to $d(\theta 1)$. Therefore, it may be obtained that the spot A is a spot on the edge of the obstacle.

In another embodiment of the present invention, the controller 16 may further judge, in the following manner, whether the edge of the obstacle exists:

determining a first area composed of a spot of which a depth value is zero in the area containing the obstacle;

determining a second area composed of a spot of which a depth value is not zero in the area containing the obstacle; and determining a boundary between the first area and the second area as the edge of the obstacle.

In other possible embodiments, whether the edge of the obstacle exists may alternatively be determined by judging whether a spot of which a depth value is zero exists in the scanned area. If such a spot exists, it indicates that the edge of the obstacle necessarily exists.

S15. Obtain a scanning angle at which the depth sensor scans the edge of the obstacle.

S16. Determine a movement direction of the moveable object according to the scanning angle.

In an embodiment of the present invention, the movement direction of the moveable object may be determined according to the following steps:

S161. Calculate an absolute value of difference between the scanning angle at which the depth sensor scans the edge of the obstacle and a half angle of view of the depth sensor.

S162. Select a minimum value in the absolute value.

S163. Adjust a heading direction of the moveable object according to the minimum value in the absolute value, to enable the moveable object to fly to a side of the edge of the obstacle.

For detailed content about the steps in the method, reference may be made to the foregoing description, and details are not described herein again.

Figure 9:
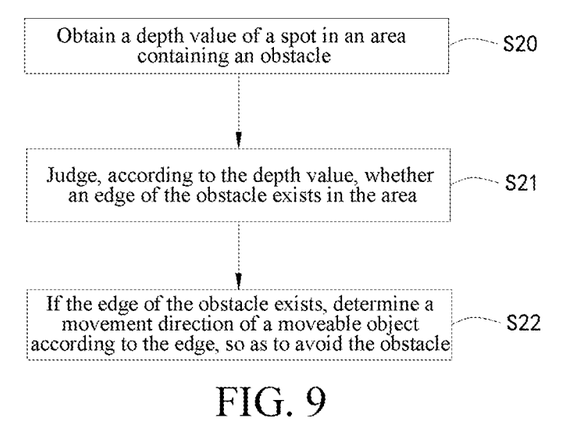
FIG. 9 is a flowchart of an obstacle avoidance method according to another embodiment of the present invention.

As shown in FIG. 9, another embodiment of the present invention provides an obstacle avoidance method. The method is applied to a moveable object, and includes the following steps:

S20. Obtain a depth value of a spot in an area containing an obstacle, the depth value representing a distance between the spot and a moveable object.

S21. Judge, according to the depth value, whether an edge of the obstacle exists in the area.

S22. If the edge of the obstacle exists, determine a movement direction of the moveable object according to the edge of the obstacle, so as to avoid the obstacle.

For detailed content about the steps in the method, reference may be made to the foregoing description, and details are not described herein again.

Figure 10:
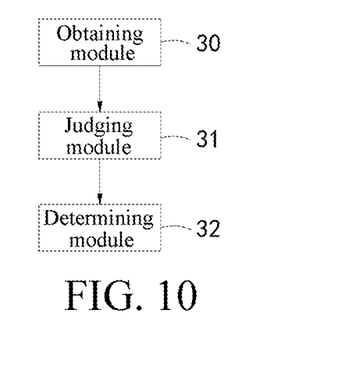
FIG. 10 is a structural block diagram of an obstacle avoidance device according to an embodiment of the present invention.

FIG. 10 is a structural block diagram of an obstacle avoidance device in an embodiment of the present invention. The obstacle avoidance device includes:

an obtaining module 30, configured to obtain a depth value of a spot in an area containing an obstacle, the depth value representing a distance between the spot and a moveable object;

a judging module 31, configured to judge, according to the depth value, whether an edge of the obstacle exists in the area; and a determining module 32, configured to determine a movement direction of the moveable object according to the edge, so as to avoid the obstacle.

Optionally, the judging module is specifically configured to:

judge whether a spot of which a depth value is zero exists in the area; and if the spot of which the depth value is zero exists, determine that the edge of the obstacle exists.

Optionally, the judging module is specifically configured to:

determine a first area composed of a spot of which a depth value is zero in the area;

determine a second area composed of a spot of which a depth value is not zero in the area; and determine a boundary between the first area and the second area as the edge of the obstacle.

Optionally, the judging module is specifically configured to:

obtain a depth value of a first spot in the area;

obtain a depth value of a second spot adjacent to the first spot in the area;

judge whether the depth value of the first spot and the depth value of the second spot meet a preset condition; and if the depth value of the first spot and the depth value of the second spot meet the preset condition, judge that the edge of the obstacle exists between the first spot and the second spot.

Optionally, the judging module is specifically configured to:

determine that the depth value of at least one of the first spot and the second spot is not zero;

judge whether a spot of which a depth value is zero exists in the first spot and the second spot; and if the spot of which the depth value is zero exists in the first spot and the second spot, determine that the depth value of the first spot and the depth value of the second spot meet the preset condition.

Optionally, the judging module is specifically configured to:

determine that an absolute value of a difference between the depth value of the first spot and the depth value of the second spot is greater than a preset value.

Optionally, the preset value is a value greater than zero.

Optionally, the judging module is specifically configured to:

determine that a sum of the depth value of the first spot and the depth value of the second spot is greater than zero.

Optionally, the judging module is specifically configured to:

determine whether a product of the depth values of the two spots is zero; and if the product is zero, determine that the spot of which the depth value is zero exists in the first spot and the second spot.

Optionally, the obtaining module scans the area by using a depth sensor, to obtain the depth value of the spot.

Optionally, the depth sensor includes at least one of the following:

a binocular camera, a laser radar, a structured light depth camera, or a TOF depth camera.

Optionally, the determining module is configured to:

obtain a scanning angle at which the depth sensor scans the edge of the obstacle; and determine the movement direction of the moveable object according to the scanning angle.

Optionally, the determining module is specifically configured to:

calculate an absolute value of difference between the scanning angle at which the depth sensor scans the edge of the obstacle and a half angle of view of the depth sensor;

select a minimum value in the absolute value; and adjust a heading direction of the moveable object according to the minimum value in the absolute value, to enable the moveable object to fly to a side of the edge of the obstacle.

Optionally, the obtaining module scans, by using the depth sensor, the area in a horizontal direction, a vertical direction, or any other direction, to obtain the depth value of the spot.

Optionally, the moveable object includes any of the following:

a manned aircraft, an unmanned aircraft, a robot, an automobile, or a boat.

In an embodiment of the present invention, the obtaining module 30 may include the depth sensor. The judging module 31 and a determining module 32 may be controllers.

An embodiment of the present invention further provides an aircraft including a memory and a processor. The memory stores a computer program, and when the computer program is executed by the processor, the processor is enabled to execute the method described in the embodiment shown in FIG. 7 or FIG. 9.

An embodiment of the present invention further provides a computer readable storage medium that stores a computer program. When the computer program is executed by a processor, the processor is enabled to execute the method described in the embodiment shown in FIG. 7 or FIG. 9.

Although the aircraft is disclosed above in the implementations of the present invention, the content is merely the implementations adopted to facilitate understanding of the present invention, and is not intended to limit the present invention. Any person skilled in the art may make various variations and modifications to the forms and details of implementations without departing from the spirit and scope disclosed in the present invention. However, the patent protection scope of the present invention still should fall within the scope defined by the appended claims.

What is claimed is:

1. An obstacle avoidance method, applied to a moveable object, and comprising: obtaining a depth value of a spot in an area containing an obstacle, the depth value representing a distance between the spot and the moveable object;

judging, according to the depth value, whether an edge of the obstacle exists in the area; and when the edge of the obstacle exists in the area, determining a movement direction of the moveable object according to the edge, so as to avoid the obstacle.

2. The obstacle avoidance method according to claim 1, wherein the judging, according to the depth value, whether an edge of the obstacle exists in the area comprises:

determining a first area composed of a spot of which a depth value is zero in the area;

determining a second area composed of a spot of which a depth value is not zero in the area; and determining a boundary between the first area and the second area as the edge of the obstacle.

3. The obstacle avoidance method according to claim 1, wherein the judging, according to the depth value, whether an edge of the obstacle exists in the area comprises: obtaining a depth value of a first spot in the area; obtaining a depth value of a second spot adjacent to the first spot in the area; judging whether the depth value of the first spot and the depth value of the second spot meet a preset condition; and when the depth value of the first spot and the depth value of the second spot meet the preset condition, judging that the edge of the obstacle exists between the first spot and the second spot.

4. The obstacle avoidance method according to claim 3, wherein the judging whether the depth value of the first spot and the depth value of the second spot meet a preset condition comprises: determining that the depth value of at least one of the first spot and the second spot is not zero; judging whether a spot of which a depth value is zero exists in the first spot and the second spot; and when the spot of which the depth value is zero exists in the first spot and the second spot, determining that the depth value of the first spot and the depth value of the second spot meet the preset condition.

5. The obstacle avoidance method according to claim 4, wherein the determining that the depth value of at least one of the first spot and the second spot is not zero comprises:

determining that an absolute value of a difference between the depth value of the first spot and the depth value of the second spot is greater than a preset value.

6. The obstacle avoidance method according to claim 5, wherein the preset value is a value greater than zero.

7. The obstacle avoidance method according to claim 4, wherein the determining that the depth value of at least one of the first spot and the second spot is not zero comprises:

determining that a sum of the depth value of the first spot and the depth value of the second spot is greater than zero.

8. The obstacle avoidance method according to claim 4, wherein the judging whether a spot of which a depth value is zero exists in the first spot and the second spot comprises: determining whether a product of the depth values of the two spots is zero; and when the product is zero, determining that the spot of which the depth value is zero exists in the first spot and the second spot.

9. The obstacle avoidance method according to claim 1 wherein the obtaining a depth value of a spot in an area containing an obstacle comprises: scanning the area by using a depth sensor, to obtain the depth value of the spot.

10. The obstacle avoidance method according to claim 9, wherein the depth sensor comprises at least one of the following: a binocular camera, a laser radar, a structured light depth camera, or a time of flight (TOF) depth camera.

11. The obstacle avoidance method according to claim 9, wherein the determining a movement direction of the moveable object according to the edge comprises: obtaining a scanning angle at which the depth sensor scans the edge of the obstacle; and determining the movement direction of the moveable object according to the scanning angle.

12. The obstacle avoidance method according to claim 11, wherein the determining the movement direction of the moveable object according to the scanning angle comprises: calculating an absolute value of a difference between the scanning angle at which the depth sensor scans the edge of the obstacle and a half angle of view of the depth sensor; selecting a minimum value in the absolute value; and adjusting a heading direction of the moveable object according to the minimum value in the absolute value, to enable the moveable object to fly to a side of the edge of the obstacle.

13. The obstacle avoidance method according to claim 9, wherein the scanning the area by using a depth sensor, to obtain the depth value of the spot comprises: scanning, by using the depth sensor, the area in a horizontal direction, a vertical direction, or any other direction, to obtain the depth value of the spot.

14. A moveable object, comprising a main body and a depth sensor connected to the main body, wherein the depth sensor is configured to obtain a depth value of a spot in an area containing an obstacle, the depth value representing a distance between the spot and the moveable object; and the moveable object further comprises a controller, the controller being configured to: judge, according to the depth value, whether an edge of the obstacle exists in the area; and when the edge of the obstacle exists in the area, determine a movement direction of the moveable object according to the edge, so as to avoid the obstacle.

15. The moveable object according to claim 14, wherein the controller is specifically configured to: determine a first area composed of a spot of which a depth value is zero in the area; determine a second area composed of a spot of which a depth value is not zero in the area; and determine a boundary between the first area and the second area as the edge of the obstacle.

16. The moveable object according to claim 14, wherein the controller is specifically configured to: obtain a depth value of a first spot in the area; obtain a depth value of a second spot adjacent to the first spot in the area; judge whether the depth value of the first spot and the depth value of the second spot meet a preset condition; and when the depth value of the first spot and the depth value of the second spot meet the preset condition, judge that the edge of the obstacle exists between the first spot and the second spot.

17. The moveable object according to claim 16, wherein the controller is specifically configured to: determine that the depth value of at least one of the first spot and the second spot is not zero; judge whether a spot of which a depth value is zero exists in the first spot and the second spot; and when the spot of which the depth value is zero exists in the first spot and the second spot, determine that the depth value of the first spot and the depth value of the second spot meet the preset condition.

18. The moveable object according to claim 17, wherein the controller is specifically configured to: determine that an absolute value of a difference between the depth value of the first spot and the depth value of the second spot is greater than a preset value.

19. The moveable object according to claim 18, wherein the preset value is a value greater than zero.

20. The moveable object according to claim 17, wherein the controller is specifically configured to: determine that a sum of the depth value of the first spot and the depth value of the second spot is greater than zero.

21. The moveable object according to claim 17, wherein the controller is specifically configured to: determine whether a product of the depth values of the two spots is zero; and when the product is zero, determine that the spot of which the depth value is zero exists in the first spot and the second spot.

22. The obstacle avoidance device according to claim 14, wherein the controller is configured to scan the area by using the depth sensor, to obtain the depth value of the spot.

23. The moveable object according to claim 22, wherein the depth sensor comprises at least one of the following: a binocular camera, a laser radar, a structured light depth camera, or a TOF depth camera.

24. The moveable object according to claim 22, wherein the controller is specifically configured to: obtain a scanning angle at which the depth sensor scans the edge of the obstacle; and determine the movement direction of the moveable object according to the scanning angle.

25. The moveable object according to claim 24, wherein the controller is specifically configured to: calculate an absolute value of difference between the scanning angle at which the depth sensor scans the edge of the obstacle and a half angle of view of the depth sensor; select a minimum value in the absolute value; and adjust a heading direction of the moveable object according to the minimum value in the absolute value, to enable the moveable object to fly to a side of the edge of the obstacle.

26. The moveable object according to claim 22, wherein the controller scans, by using the depth sensor, the area in a horizontal direction, a vertical direction, or any other direction, to obtain the depth value of the spot.

* * * * *